(12) United States Patent
Hiddessen et al.

(10) Patent No.: US 6,257,548 B1
(45) Date of Patent: *Jul. 10, 2001

(54) VALVE CONSTRUCTION

(75) Inventors: Ralf Hiddessen, Lehrte; Jan-Peter Ossenbrugge, Langenhagen; Horst Grove, Böhmeweg; Frank Rieck, Burgdorf, all of (DE)

(73) Assignee: Nass Magnet GmbH, Hannover (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/852,243

(22) Filed: May 6, 1997

(30) Foreign Application Priority Data

May 30, 1996 (DE) ................................ 196 21 796

(51) Int. Cl.⁷ .......................... F16K 3/18; F16K 31/06
(52) U.S. Cl. .................. 251/129.06; 251/161; 251/187
(58) Field of Search ............... 137/625.25, 625.65; 251/129.06, 158, 176, 187, 129.15, 161, 160

(56) References Cited

U.S. PATENT DOCUMENTS

| | | | |
|---|---|---|---|
| 181,334 | * 8/1876 | Hall | 251/187 |
| 1,250,041 | * 12/1917 | Snyder | 251/187 |
| 1,271,670 | * 7/1918 | Conrad | 251/129.15 |
| 2,381,431 | * 8/1945 | Bordo | 251/187 |
| 2,819,034 | * 1/1958 | Holderer | 251/158 X |
| 3,063,468 | * 11/1962 | Dufour | 251/161 X |
| 3,325,140 | * 6/1967 | Kooistra | 251/161 |
| 4,156,437 | * 5/1979 | Chivens et al. | 251/161 X |
| 4,534,540 | * 8/1985 | Bragin et al. | 251/187 X |
| 4,581,624 | * 4/1986 | O'Connor | 251/129.06 |
| 4,610,426 | * 9/1986 | Brandner | 251/129.06 |
| 4,678,000 | 7/1987 | Kushida . | |
| 4,747,577 | * 5/1988 | Dimock | 251/158 |
| 4,750,706 | * 6/1988 | Schlagmuller | 251/129.06 |
| 4,756,508 | * 7/1988 | Giachino et al. | 251/129.06 X |
| 4,971,106 | * 11/1990 | Tsutsui et al. | 251/129.06 |
| 4,989,641 | * 2/1991 | Jones et al. | 251/161 X |
| 5,074,525 | * 12/1991 | Kujala | 251/161 X |
| 5,295,509 | * 3/1994 | Suto et al. | 251/129.06 |
| 5,318,271 | * 6/1994 | Frisch | 251/129.06 |
| 5,620,165 | * 4/1997 | Dean | 251/187 X |
| 5,683,072 | * 11/1997 | Ohmi et al. | 251/187 X |

FOREIGN PATENT DOCUMENTS

| | | | |
|---|---|---|---|
| 1241214 | * 5/1967 | (DE) | 251/161 |
| 151680 | * 7/1987 | (JP) | 251/129.06 |

* cited by examiner

*Primary Examiner*—John Rivell
*Assistant Examiner*—Meredith H. Schoenfeld
(74) *Attorney, Agent, or Firm*—Reising, Ethington, Barnes, Kisselle, Learman & McCulloch, P.C.

(57) ABSTRACT

The invention relates to a valve having a housing in which there is a passage having at least two spaced ports. A slide is accommodated in the passage for to and fro movements between at least two positions in one of which at least one of the ports is open and in the other of which such port is closed. A slide actuator effects movements of the slide and the slide carries a seal which effects a seal of the closed port when the slide is in the port-closing position. The seal has a sealing actuator operable separately from the slide actuator to apply a sealing force to the seal. The force applied to the seal is neutralized in response to actuation of the slide.

20 Claims, 3 Drawing Sheets

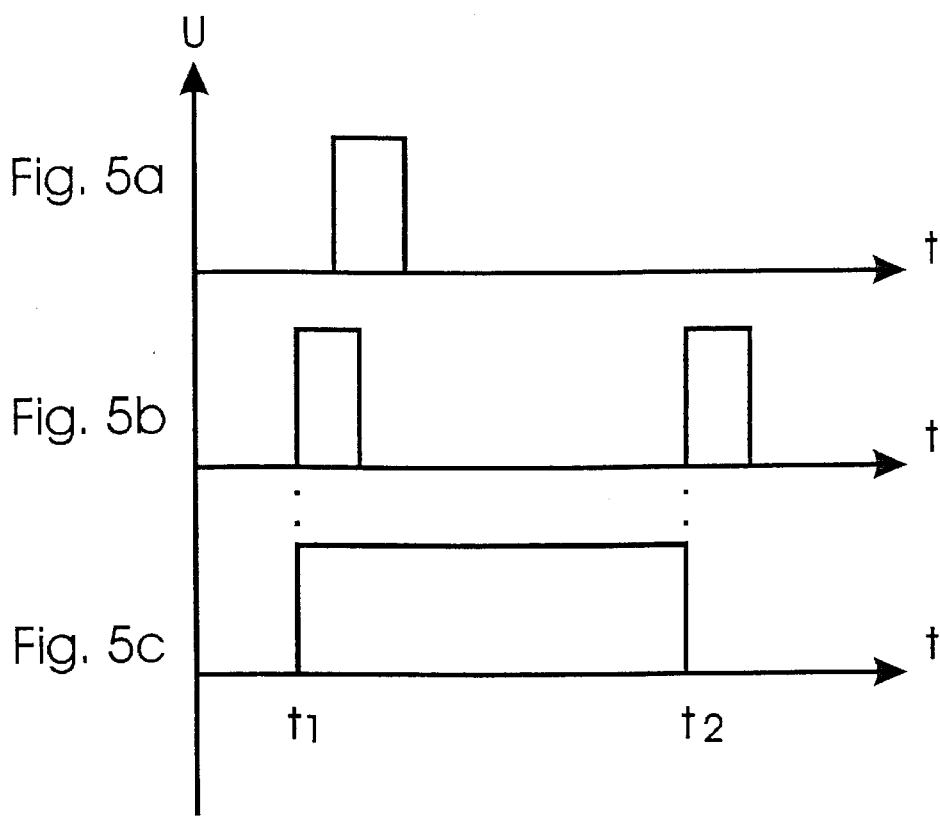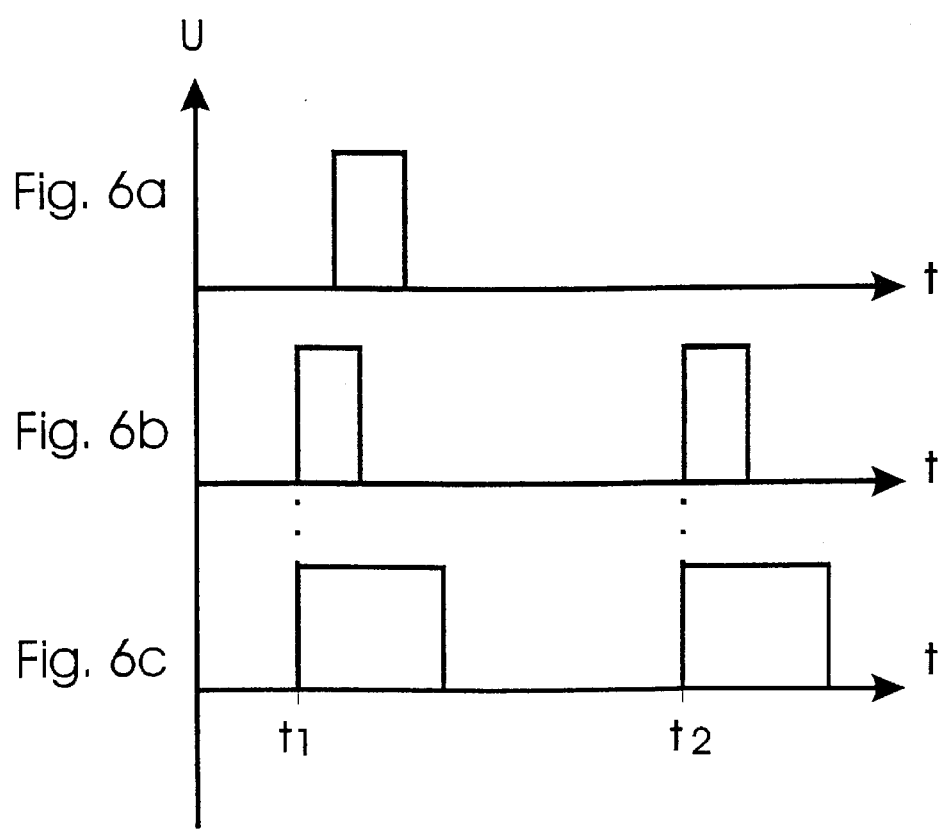

VALVE CONSTRUCTION

The invention relates to a valve construction having a housing within which are at least two ports and a slide movable between positions in which at least one of the ports is selectively open or closed.

BACKGROUND OF THE INVENTION

Valves are known in the art for the most varied uses. They have at least two connections and a slide which is movable to and fro between at least two setting positions, wherein the slide seals at least one connection in one setting position and opens it in the other setting position. Positioning means to perform the positioning function and sealing means to perform the sealing function of the slide are also provided.

An electromagnetic injection valve for fuels is known from U.S. Pat. No. 4,679,000, in which a slide opens the communication between two connections in one setting position and closes it in the other setting position. By control of an electromagnetic actuating device the slide is brought into the closed position, the front end thereof coming into contact with a corresponding seal seat. Thus the electromagnetic actuating device on the one hand produces the positioning force and on the other hand produces the sealing force onto the slide. In the closed position the slide is clamped by means of a piezoelectric element. In this known valve the electromagnetic actuating device is of relatively large construction since on the one hand it must provide a relatively large adjustment distance of the slide and on the other hand it must apply a relatively great sealing force in the closed position.

The object of the invention, therefore, is to improve the known valve so that it can be set more effectively and more reliably.

SUMMARY OF THE INVENTION

According to the invention this object is achieved by the characterising feature of claim 1, in that the positioning means have a positioning actuator and the sealing means have a sealing actuator which can be control led separately from one another. Thus the "positioning" and "sealing" functions of the slide during the valve operation can be achieved by a plurality of separate actuators. In this case each actuator can be optimally designed for its function, particularly with regard to adjustment distance and adjusting force. Thus a comparatively large adjustment distance with a small adjusting force will be required of the positioning actuator, whilst the requirements are the reverse for the sealing actuator, namely a small adjustment distance and a relatively great adjusting force.

THE DRAWINGS

FIGS. 5a to 5c show control characteristics of the valve according to a first control arrangement, and FIGS. 6a to 6c show control characteristics according to a second control arrangement.

THE PREFERRED EMBODIMENTS

Figure 1:
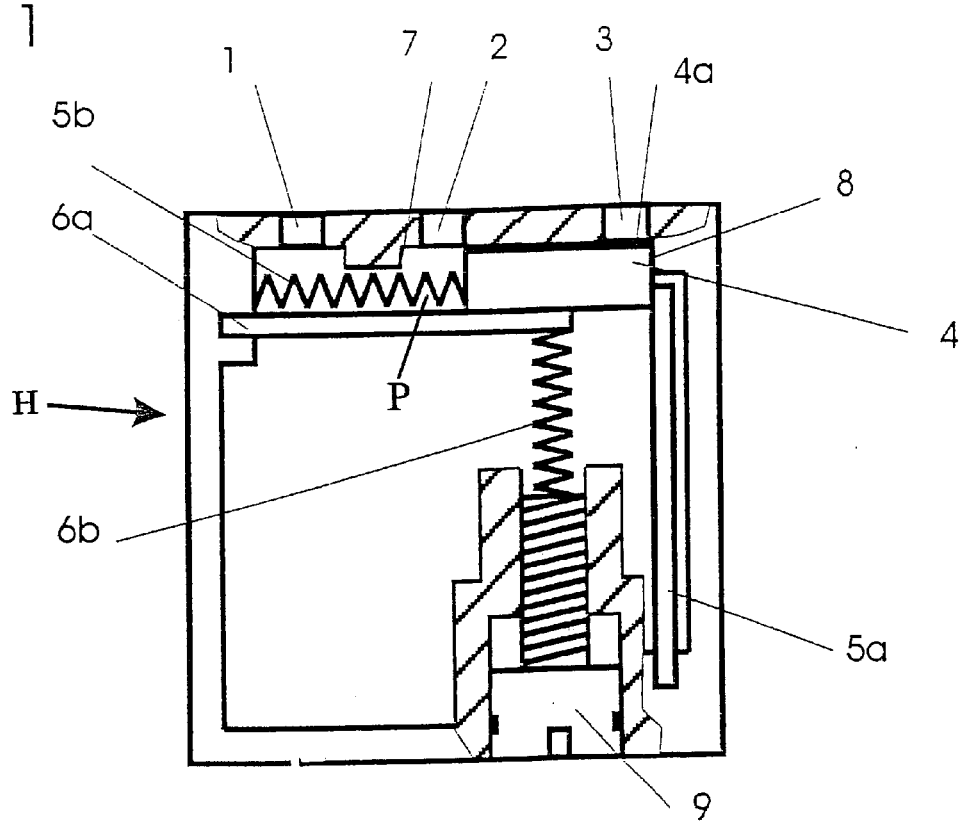
FIG. 1 shows a schematic representation of a first embodiment.

A 3/2-way valve is shown in FIG. 1. This valve has a housing H within which is a passage P in communication with three spaced ports or connections 1, 2, and 3. The port 1 is a pressure connection, the port 2 is an equipment connection, and the port 3 is an air exhaust connection. A slide 4 is accommodated in the passage P and is movable to and fro between two setting positions, whereby in the illustrated setting position the slide closes the exhaust air connection 3 and establishes communication between the equipment connection 1 and the pressure connection 2 and in the other setting position it opens the exhaust air connection 3 and in this way establishes communication between the equipment connection 1 and the exhaust air connection 3.

Positioning or slide actuating means for performing the positioning function are also connected to the slide 4, these positioning means being formed by a positioning actuator 5a and an elastic element, particularly a first spring element 5b. In order to perform the sealing function sealing means are provided which comprise a sealing actuator 6a and a second spring element 6b. In the illustrated embodiment both the positioning actuator 5a and the sealing actuator 6a are formed by a piezoelectric bending tongue clamped on one end.

By corresponding charging with voltage the positioning actuator 5a is energised so that it displaces the slide 4 towards the left against the force of the spring element 5b. At the same time the sealing actuator 6a is energised in such a way that it neutralises or relieves the sealing force exerted by the second spring element 6b on the slide. The restoring of the sealing actuator 6a and thus the exerting of the sealing force takes place after displacement of the slide 4 by the second spring element 6b. The two actuators 5a, 6a must not transmit any further forces to the slide after the displacement of the slide 4. This has the great advantage that no so-called "creeping" can take place in the actuators formed by the bending tongues. This creeping can occur particularly when a bending tongue must be deflected for a relatively long time, since it is then possible for slipping of the adhesive layer in thee actuator to occur.

The two end or setting positions of the slide 4 are advantageously delimited by two stops 7, 8.

In contrast to the positioning actuator 5a, the sealing actuator 6a merely requires a short adjustment distance. In order to be able to compensate for any manufacturing tolerances, the spring force of the second spring element 6b is set by an adjusting screw 9.

The slide 4 has a seal 4a, particularly an elastic coating, which comes into operative connection with a corresponding connection and is provided on a lateral surface of the slide which is disposed transversely with respect to the direction of movement of the slide.

The second embodiment which is shown in FIG. 2 again shows a 3/2-way valve, but in this case the exhaust air connection 3' is disposed transversely with respect to the equipment connection 1 and to the pressure connection 2 on another side of the valve. The slide 4 is again movable to and fro between two positions by means of a positioning actuator 5a. The sealing means are formed by a second spring element 6b and a sealing actuator 6'a, the sealing actuator 6'a being provided as an armature which can be operated electromagnetically.

Thus for displacement of the slide 4 the sealing actuator 6'a is first of all actuated in order to neutralise or relieve the spring force of the second spring element 6b, so that the positioning actuator 5a can then be controlled. In the illustrated embodiment the positioning actuator 5a is again formed by a piezoelectric bending tongue which is clamped on one end to the housing and on the opposite end to the slide, restoring of the slide 4 being achieved by the spring force present in the positioning actuator 5a. However, in this construction it is possible for the "creeping" described above to occur.

In the illustrated embodiment the exhaust air connection 3' is disposed perpendicular to the equipment connection 1 and to the pressure connection 2. This has the advantage that the system pressure which presses the slide from the interior onto the exhaust air connection 3' only acts when the slide 4 has not yet been displaced. As soon as the slide is slightly lifted off from the exhaust air connection 3' the pressure drops and thus so does the force on the positioning actuator 5a. This force then acts against the positioning actuator 5a which is constructed as a piezoelectric bending tongue and which can reach the highest force with minimal deflection.

Figure 2:
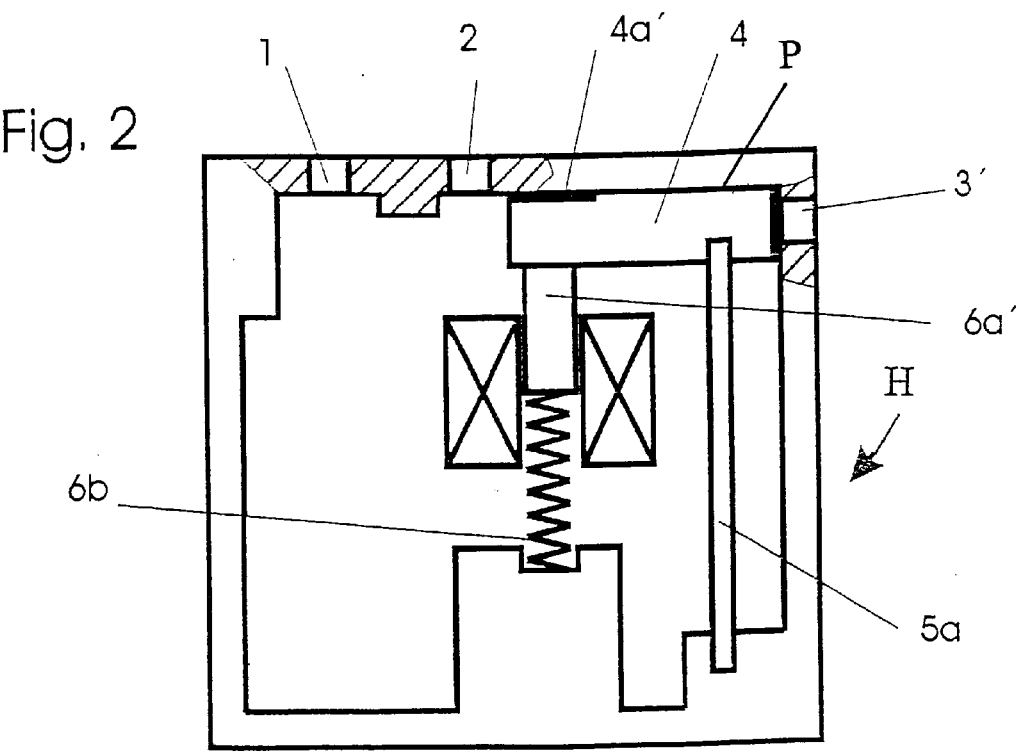
FIG. 2 shows a schematic representation of a second embodiment.

By comparison with FIG. 2 the embodiment according to FIG. 1 has the disadvantage that the compressive force on the exhaust air connection 3 acts as a normal force on the frictional force of the slide 4, all the more so over a longer path.

Figure 3:
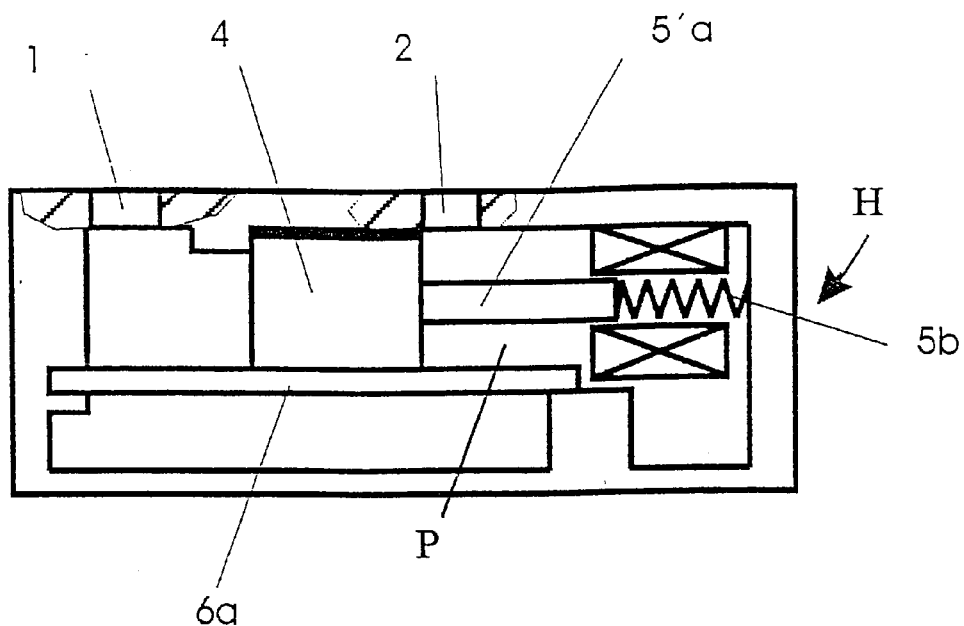
FIG. 3 shows a schematic representation of a third embodiment.

The third embodiment which is illustrated in FIG. 3 shows a 2/2-way valve in which only an equipment connection 1 and a pressure connection 2 is provided, wherein the slide 4 opens the pressure connection 2 in one setting position and closes it in the other setting position.

The positioning movement of the slide 4 is achieved here by an electromagnetic positioning actuator 5'a which in turn co-operates with a first spring element 5b.

The sealing force is produced by a piezoelectric bending strip 6a which is designed to increase a positioning force on both sides. In the illustrated embodiment the sealing actuator 6a operates without an additional spring element against the slide 4. The necessary spring force can then be produced for example by pretensioning of the sealing actuator.

Figure 4:
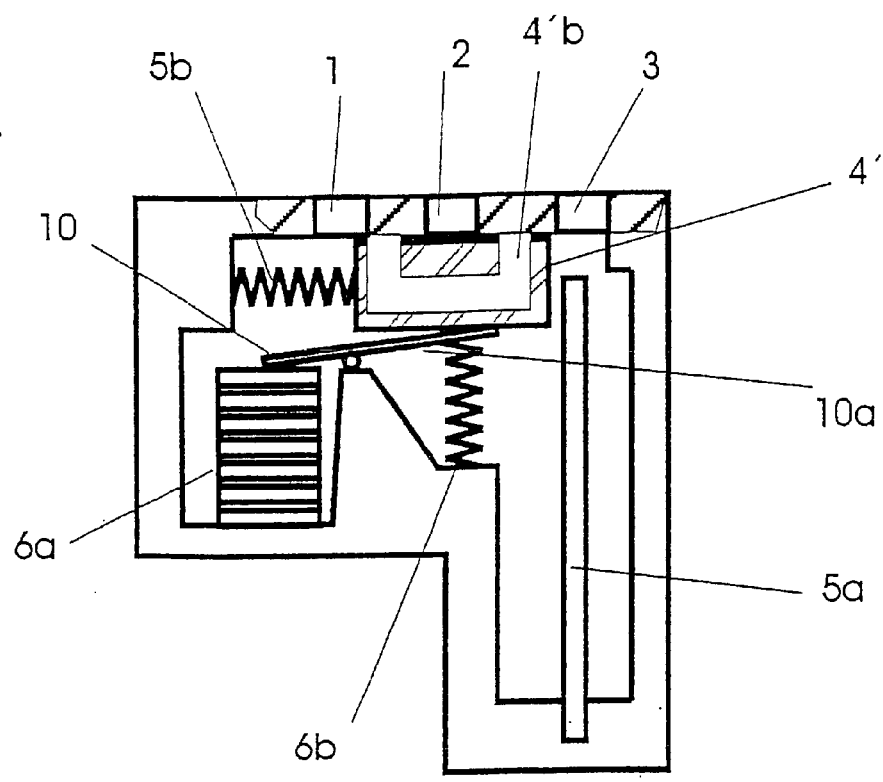
FIG. 4 shows a schematic representation of a fourth embodiment.

The fourth embodiment which is illustrated in FIG. 4 again corresponds by its outer connections to the 3/2-way valve illustrated in FIG. 1. The positioning means are formed by a positioning actuator 5a constructed as a piezoelectric bending tongue and first spring element 5b. The sealing force is produced by a spring element 6b, whilst neutralising or relieving of this sealing force is effected by way of a sealing actuator 6a constructed as a stack piezo. A lever 10 is used to increase the deflection of the sealing actuator 6a.

The illustrated side 4' has a bore 4'b through which the medium is passed in the open state, i.e. when the equipment connection is in communication with the pressure connection 2. The particular advantage with this construction of the slide 4 is that small pressure-filled volumes are produced in the valve so that the time required for the build-up of pressure is short.

Within the scope of the invention the elements illustrated in the individual embodiments are interchangeable with one another. What is special about all the embodiments is that the "positioning" function and the "sealing" function are carried out by two actuators which are separate from one another. Whereas the positioning actuator requires the greatest possible adjustment path and the sealing actuator requires the greatest possible sealing force, each actuator can therefore be optimally designed for its function. Since the positioning actuator and the sealing actuator act in different directions on the slide 4, 4', the functions can also be clearly separated from one another. In some cases the sealing actuator also performs a function of clamping the slide as well as the sealing function.

Three curve traces are shown in FIGS. 5a to 5c, FIG. 5 showing the control of the entire valve as seen from outside. FIGS. 5a shows the control of the positioning actuator and 5b shows the control of the sealing actuator. In all three cases the control voltage U is shown relative to the time t. In order to open the valve during a time period from $t_1$ to $t_2$, first of all the sealing actuator is operated at the time $t_1$. The positioning actuator is actuated simultaneously or with some time delay.

Because of the autonomous return of the slide when the sealing force is neutralised, in order to close the valve at the time $t_2$ it is merely necessary to control the sealing actuator.

In the bistable control of the valve which is illustrated in FIGS. 6a to 6b an electrical impulse is used in each case to alternate between the "open" and "closed" positions. In order with a pulse to change to the respective other valve state, the respective last position of the valve (open or closed) must be stored temporarily in a memory. When a signal arrives, depending upon the contents of the memory both the actuators are operated for opening of the valve or only the sealing actuator is operated for closing it.

What is claimed is:

1. A valve construction comprising
a housing having a passage therein,
said passage having at least two spaced apart fluid ports;
a single slide member accommodated in said passage for sliding movements in opposite directions between a first position in which at least one of said ports is closed and a second position in which said one of said ports is open;
slide actuating means for moving said slide in opposite directions between said positions;
elastic sealing means carried by said slide in a position to seal said one of said ports when said slide is in said first position;
yieldable means operable when said slide is in each of said positions to yieldably maintain said slide in each of said positions and apply a force on said sealing means via said slide,
the application of said force on said sealing means when said slide is in said first position being operable to seal said one of said ports,
said yieldable means being operable while said slide is in each of said positions to neutralize said applied force prior to the operation of said slide actuating means to move said slide from either one of said positions toward the other position.

2. The construction according to claim 1 wherein said slide actuating means and said yieldable means are operable separately.

3. The construction according to claim 1 wherein said slide actuating means and said yieldable means act on said slide in different directions.

4. The construction according to claim 1 wherein said slide actuating means is electrically operable.

5. The construction according to claim 1 wherein said yieldable means is electrically operable.

6. The construction according to claim 1 wherein said slide actuating means when actuated traverses a relatively long path and wherein said yielding means when operable traverses a relatively short path.

7. The construction according to claim 6 wherein said slide actuating means when actuated exerts a relatively small force on said slide and said seal actuating means when actuated exerts a relatively large force on said sealing means.

8. The construction according to claim 1 wherein said actuating means comprises an electromagnet.

9. The construction according to claim 1 wherein yieldable means comprises an electromagnet.

10. The construction according to claim 1 wherein said actuating means comprises a piezoelectric bending strip.

11. The construction according to claim 10 wherein yieldable means comprises a piezoelectric bending strip.

12. The construction according to claim 10 wherein said bending strip is clamped on two opposite sides.

13. The construction according to claim 1 wherein said actuating means comprises a stack piezo.

14. The construction according to claim 13 including a lever coupling said stack piezo and said slide.

15. The construction according to claim 1 wherein said slide actuating means and said yielding means are movable in directions perpendicular to one another.

16. The construction according to claim 1 wherein said sealing means is positioned on said slide in a position transverse to the direction of movement of said slide.

17. The construction according to claim 1 wherein said sealing means comprises a releasable clamp for releasably maintaining said slide in either selected one of said positions.

18. The construction according to claim 1 wherein said yieldable means includes means for releasably maintaining said slide in either selected one of said positions.

19. The construction according to claim 1 wherein said valve construction comprises a multiple-way valve.

20. The construction according to claim 1 wherein said sealing means is formed of elastic material.

* * * * *

UNITED STATES PATENT AND TRADEMARK OFFICE
CERTIFICATE OF CORRECTION

PATENT NO. : 6,257,548 B1
DATED : July 10, 2001
INVENTOR(S) : Ralf Hiddessen et al It is certified that error appears in the above-identified patent and that said Letters Patent is hereby corrected as shown below:

<u>Title page,</u>
Item [57], should read --

ABSTRACT

The invention relates to a valve having a housing in which there is a passage having at least two spaced ports. A slide is accommodated in the passage for to and fro movements between at least two positions in one of which at least one of the ports is closed. A slide actuator effects movements of the slide and the slide carries a seal which effects a seal of the closed port when the slide is in the port-closing position. The seal has a sealing actuator operable separately from the slide actuator to apply a sealing force to the seal. The sealing force is neutralized prior to movement of the slide.

<u>Column 1,</u>
Line 42, change "control led" to -- controlled --.

<u>Column 3,</u>
Line 44, after "and" insert -- a --.

<u>Column 4,</u>
Line 7, change "FIGS. 5a" to -- FIG. 5a --;
Line 67, change "yielding" to -- yieldable --.

<u>Claim 15,</u> should read --

15. The construction according to claim 1 wherein said yieldable means and said seal actuating means are movable in directions perpendicular to one another. --.

Signed and Sealed this

First Day of January, 2002

Attest:

Attesting Officer

JAMES E. ROGAN
*Director of the United States Patent and Trademark Office*